Sept. 12, 1967  J. J. FRY  3,341,760
END POSITION INDICATING DEVICES FOR VALVE ACTUATORS
Filed June 5, 1964  2 Sheets-Sheet 1
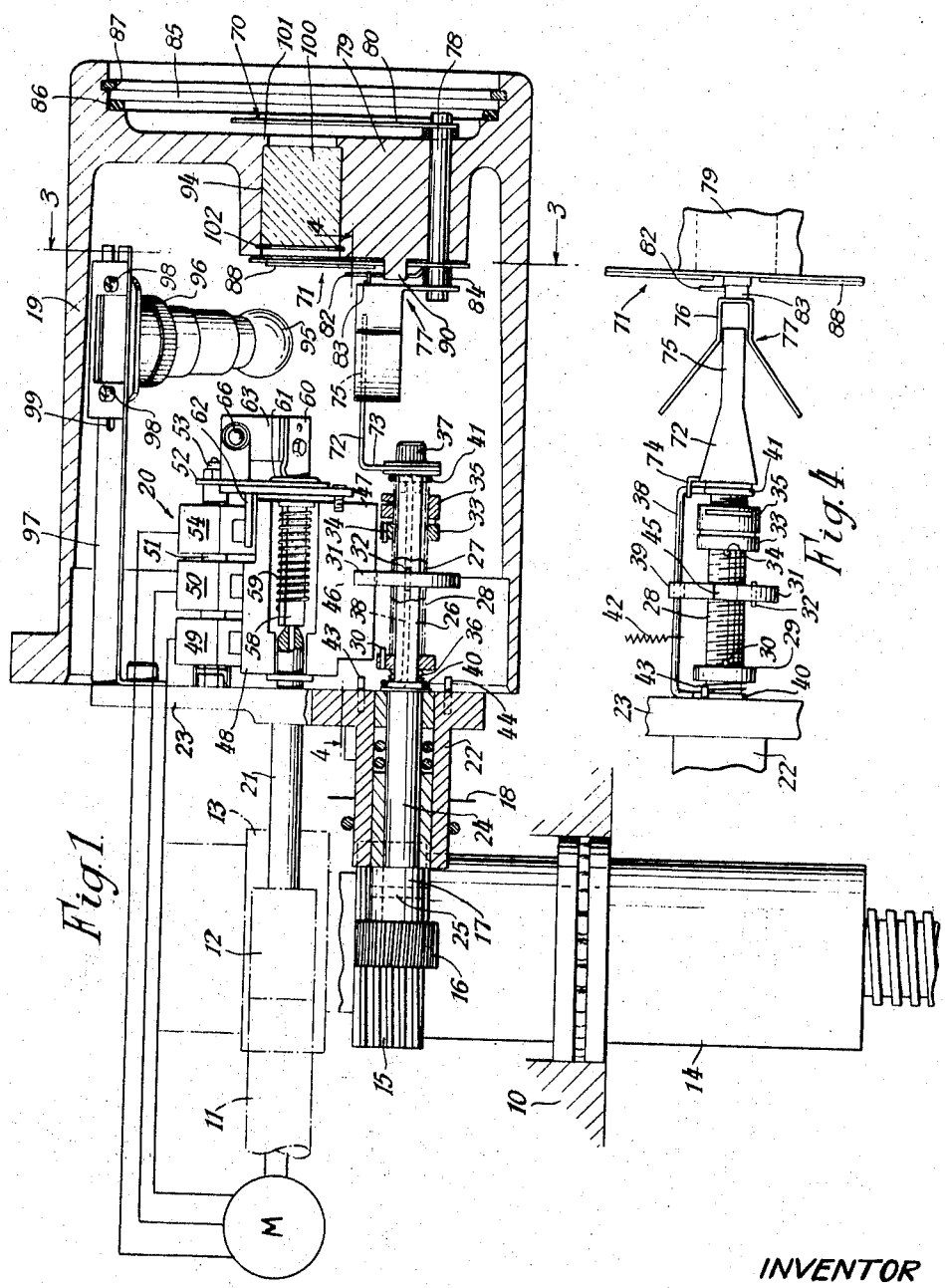
INVENTOR
Jeremy Joseph Fry
BY
Stevens, Davis, Miller & Mosher
ATTORNEYS

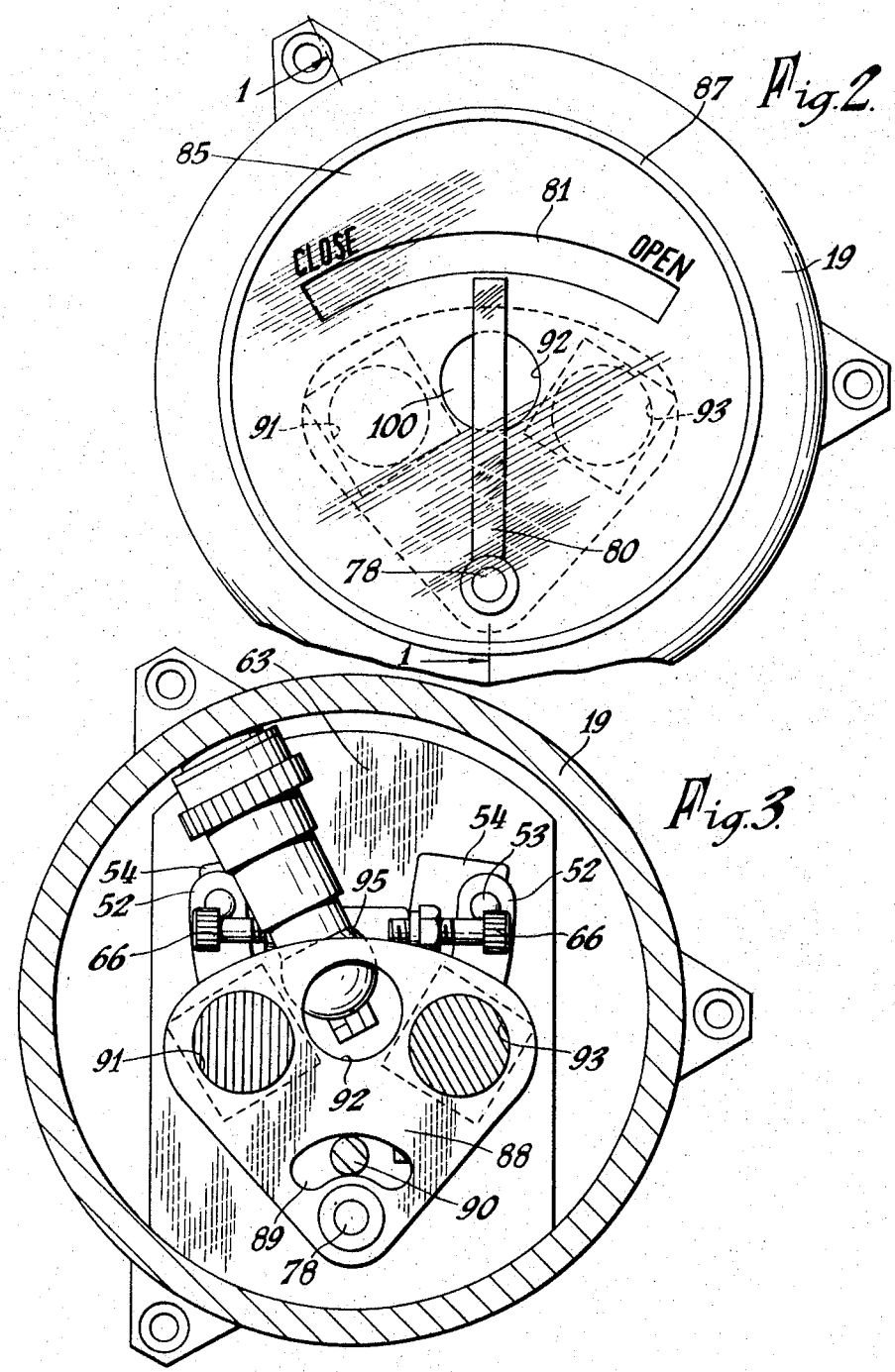

United States Patent Office 3,341,760
Patented Sept. 12, 1967

3,341,760
END POSITION INDICATING DEVICES FOR VALVE ACTUATORS
Jeremy Joseph Fry, Bath, Somerset, England, assignor to Rotork Engineering Company Limited, Somerset, England
Filed June 5, 1964, Ser. No. 372,998
Claims priority, application Great Britain, June 7, 1963, 22,843/63
12 Claims. (Cl. 318—469)

This invention relates to valve actuators having an end position indicator.

The present application is particularly, but not exclusively, concerned with a control unit of the kind described in my copending U.S. patent application Ser. No. 197,-183, filed May 21, 1962, now U.S. Patent No. 3,209,090, and which is operable by the movement of a valve actuator. The control unit includes a plurality of switches which form part of electrical circuits controlling the operation of the actuator. In particular the control unit of said U.S. Patent No. 3,209,090 is intended for operation with valve actuators of the kind described and claimed in my copending U.S. patent application Ser. No. 175,769, filed Feb. 26, 1962, now U.S. Patent No. 3,198,033.

Valve actuators of the kind described in these prior cases include an output spindle or shaft which is capable of rotary movement to open or close the associated valve or other apparatus. The output shaft of the actuator is selectively rotated by either manual means, such as a hand wheel, or by a motor-driven shaft or spindle which operates through a worm and wormwheel. The motor spindle or shaft is mounted for limited axial movement in response to any undue increase in the torque required for moving the valve to the desired position. The control unit of said U.S. Patent No. 3,209,090 is operable first of all to utilize the rotary movement of the output shaft to operate limit switches; for example, for de-energizing the motor circuit of the actuator when a predetermined position has been reached in either direction of movement of the actuator. The control unit is secondly capable of utilizing the axial movement of the motor spindle or shaft to operate torque/limit switches which also control the motor circuits of the valve actuator.

The construction of the control unit as described in said U.S. Patent No. 3,209,090 includes a switch operating mechanism which is rotatably movable in accordance with the output movement of the actuator to operate the limit switches described above. The present invention is particularly concerned with utilizing this movement of the switch operating mechanism to operate also an end position indicator so that the operator will have an external indication of the position of the valve when it reaches its predetermined end positions. The position indicator will also show to the operator that the limit switches have been actuated as the visual indication will have been obtained solely from the movement of the switch actuating mechanism. The invention is also concerned with the provision of an indicator which has additional visual indication by means of internal illumination.

In its broadest aspect the invention provides a valve actuator comprising an output shaft, power means operable to selectively rotate said output shaft to open or close a valve in response to rotation of said output shaft in one or other direction, and a control unit for said power means, said control unit including a pair of position limit switches connected in circuit with said power means, a switch actuating mechanism including a member angularly movable in one or other direction in response to a predetermined movement of said output shaft in one or other direction for actuating a corresponding one of said limit switches, and a visual position indicating device which is operable by the angular movement of said switch member.

In the preferred embodiment the control unit comprises a shaft rotatable in response to rotational movement of the output shaft, and a threaded hollow spindle mounted on the shaft and frictionally rotatable therewith, a switch member comprising a nut which is mounted on said threaded spindle and is normally restrained against rotation, i.e. angular movement, so as to travel along the spindle in accordance with the direction of rotation of the output shaft, said nut being rotatable with said threaded spindle when said nut reaches one of its extreme positions of movement along said spindle. The travelling nut is conveniently restrained against rotation of said threaded spindle by means of a guide rod which extends parallel to said threaded spindle and engages a notch in the periphery of the travelling nut. The guide rod is mounted at its ends on the threaded spindle and is centralized by resilient means, the angular movement of the guide rod by the travelling nut being adapted to operate said visual position indicating device. An illuminated visual position indicator is also provided by means of a source of light such as a lamp which is located within the housing of the control unit and which is adapted to illuminate, colored sections of a movable member which is mounted for movement with the pointer of the indicating device. The colored section of the movable member illuminated by the lamp is observed externally of the control unit housing through a passageway formed in the end wall of the unit.

The invention will now be described by way of example with reference to the accompanying drawings, in which:

FIGURE 1 is a side elevation through a control unit for a valve actuator and which incorporates the end position indicating devices of the invention;

FIGURE 2 is an end view of the unit showing the position indicating devices as seen by an operator;

FIGURE 3 is a sectional view on the line 3—3 of FIGURE 1; and

FIGURE 4 is a plan view taken on the line 4—4 of FIGURE 1 and showing in particular the mechanical connection between the switch actuating mechanism and the visual indicating devices.

In the drawings the invention is shown as an end position indicator for a valve actuator. The end position indicator is operable by a switch actuating mechanism which is operable by the actuator. The valve actuator is preferably of the type described in said U.S. Patent No. 3,198,033, which actuator has a hand auto arrangement and which includes a motor shaft or spindle which by means of a worm and wormwheel drives an output shaft which may be manually operated if desired.

A portion of the actuator as described above is shown in FIGURE 1 of the drawing, the main actuator casing being shown by the reference 10. The casing 10 supports the motor shaft 11 on which is mounted a worm 12 engaging a wormwheel shown diagrammatically at 13 on the output shaft 14. The output shaft 14 is provided with a worm 15 meshing with a wormwheel 16 on the secondary shaft 17 which extends through a partitioned wall 18 of the casing 10 into an auxiliary casing 19. The auxiliary casing 19 contains a control unit 20 which is also operable by a short shaft 21 loosely coupled with the motor shaft 11. As explained in said U.S. Patent No. 3,209,090 the control unit 20 is responsive to the axial movements of the motor shaft or spindle 11 through the short shaft 21 and also the rotational movements of the output shaft 14 through the secondary shaft 17 to operate torque and/or limit switches which are connected in the electrical control circuit for the electrical motor of the valve actuator.

As mentioned above, the secondary shaft 17 is rotated in accordance with rotation of the output shaft 14 of the valve and this movement is utilized normally to operate limit switches in the control unit 20 so that the motor will be de-energized when the valve has moved to its fully open or closed positions. The secondary shaft 17 is rotatably mounted in a bearing 22 forming part of a plate 23 which supports the control unit 20. The bearing 22 is mounted in the partition wall 18. The shaft 17 surrounds and is connected to a shaft 24 by a cross pin 25 the shaft 24 having an extension 26 which extends forwardly into the auxiliary casing 19 and is provided with a hollow spindle 27 concentrically mounted thereon. The spindle 27 is provided with an external screw thread 28 and at its inner end it is formed with a flange 29 provided with an axially extending pin 30 so as to provide a stop device as will be explained hereinafter. A movable nut 31 is threadably mounted on the hollow spindle 27 and is provided with a pin 32 which extends from the nut 31 axially in both directions. Although a single pin is shown it will, of course, be appreciated that the pin 32 can be formed by two separate pins each mounted in one face of the nut 31. The hollow spindle 27 is further provided with a second nut 33 which also is provided with an axially extending pin 34. Normally, the nut 33 is held in a predetermined position on the spindle 27 and rotates therewith. The nut 33 is locked in position by a nut 35.

The hollow spindle 27 is a snug fit on the extension 26 of the shaft 24 and it is caused to rotate with the extension by means of friction. Normally, therefore, the spindle 27 will rotate with the extension but when the predetermined limits have been reached for operating the limit switches the extension, by reason of its friction drive with the spindle 27, will rotate relatively thereto until the motor is de-energized. The frictional drive is obtained by clamping the flange 29 of the spindle 27 against a Belleville washer 36 and the clamping pressure is obtained by the head of a bolt 37 which may engage threadably within the outer end of the extension 26 of the shaft 24. The lengths are so arranged that it is impossible to clamp the spring washers 36 up solid.

The movable nut 31 mounted on the spindle 27 is normally prevented from rotating therewith by a wire rod 38 (FIGURE 4) which extends parallel to shaft 27 but is spaced therefrom and engages a notch 39 cut in the periphery of nut 31. The wire rod 38 is substantially U-shaped and its ends 40, 41 are formed as hooks which are mounted on and secured in position on the extension 26 of shaft 24. Normally the nut 31 remains in the angular position as shown in FIGURE 4 but in the event of an angular movement, as will be hereinafter explained, the nut is returned to its normal position by means of coil spring 42 which is secured to plate 23.

When the output shaft 14 rotates in one or the other direction to open or close the associated valve this will cause the movable nut 31 on the hollow spindle 27 to travel along the spindle in a corresponding direction. Eventually the axially extending pin 32 on the nut 31 will engage the pin 30 on the flange 29 or the pin 34 on the nut 33 depending on its direction of travel. When this occurs the travelling nut 31 is then forced to rotate against the action of the spring 42 and this rotary movement of the travelling nut 31 is utilized to operate the limit control switches and the end position indicating mechanism.

The amount of angular movement of the nut 31 is limited to approximately 45° in each direction of movement by pins 43, 44 mounted in plate 23.

It will be appreciated that the nut 33 and its lock nut 35 are adjustable to vary the number of turns of the output spindle 27 which will be permitted to suit the particular valve to be actuated. The arrangement also enables the switch mechanism to be preset for a desired number of shaft turns so that the unit can be immediately applied to an existing actuator without the necessity of readjusting the unit.

The travelling nut 31 is provided with a groove or cut-away portion 45 in its periphery (FIGURE 4) and which normally receives the edge of axially extending plate 46. The plate 46 is rotatably mounted at its rear end on the half-shaft 21 loosely coupled with the motor shaft 11. The plate comprises two sections, namely a lower section 47 which has its lower edge at all times engaging the cut-away portion 45, and an upper section 48 which is operable to actuate any desired number of switches which form part of ancillary circuits. Two pairs of such switches 49, 50 are shown in FIGURE 1 of the drawing, the switches of each pair being located on each side of the upper section 48 so as to be operable depending upon the direction of rotation of the output shaft. The switches, for the purpose of identification, are called limit switches but they may, of course, be operable for other purposes such as indication and other control means. The switches are mounted on rods 51 which extend from the plate 23 and which support a U-shaped front plate 52 which is secured thereto by nuts 53. The rods 51 further support a pair of torque/limit switches 54. The front part of the plate 46 is rotatably supported on a bearing connected to plate 52.

The axial movement of a short shaft 58 is utilized normally to operate the torque/limit switches 54 which, as in the case of the limit switches, are mounted one on each side of the plate 46. The shaft 58 is loosely coupled to the half-shaft 21 so that axial movement of the motor spindle 11 in response to an increase in torque moves the shaft 58 axially. This movement is transmitted to the shaft 58 in the outward direction only and in the other direction of movement of the motor spindle the shaft 58 follows the axial movement of the shaft 21 under the influence of a strong compression spring 59 which seats at one end against the bearing connected to plate 52 and at the other end against a washer held by a pin mounted in the shaft.

The shaft 58 is formed with a helically threaded portion 60 which passes through a nut 61 formed on the front of the U-shaped plate 52. As the shaft 58 moves axially it is therefore forced to rotate and this movement is transmitted to a switch operating lever 62 which is rotatably mounted on a bearing extending from plate 52.

The front end of the helically threaded portion 60 of the shaft 58 has a bent lever 63 mounted thereon. The lever 63 is resiliently mounted and as explained in a said U.S. Patent No. 3,209,090 the outer end of the lever is operable to strike one or other of a pair of adjustable screws 66 (FIGURE 3) which are mounted in extensions of the switch operating lever 62 and the positions of which determine the torque setting of the switches 54.

As described above the control unit has limit switches 49 and 50 operable by rotation of the shaft 17 and torque/limit switches 54 operable by the axial movement of the shaft 21 and/or rotation of shaft 17.

The end position indicating devices comprise a pointer mechanism 70 and an illuminated visual device 71 both of which are operated by the angular movement of the wire rod 38 in response to angular movement of the travelling nut 31 in its end positions. A flat lever 72 is formed with a downwardly extending front portion 73 which is freely mounted on the threaded spindle 27. The portion 73 of the lever 72 has a radially extending portion 74 which is slotted to engage over the wire rod 38 as shown particularly in FIGURE 4 of the drawings. The arrangement is such that as the wire rod 38 moves angularly about the spindle 27 to engage one of the stops 43 or 44, the flat plate 72 will be similarly moved angularly by reason of its mechanical connection.

The flat plate 72 has a portion 75 which fits snugly within the U-shaped portion 76 of a plate 77 fixed to a shaft 78 which passes through the end wall 79 of the housing 19. The outer end of the shaft 78 carries a pointer 80 which is movable against a scale 81 (FIGURE 2) so as to indicate to the operator when the actuator has reached its valve closed or open positions. At other positions of the actuator the pointer 80 will remain in its central position as shown in FIGURE 2 and this position is obtained by the centralizing lever 82 which engages a projection 83 from the U-shaped plate 76 under the influence of a spring 84 mounted on the shaft 78.

The pointer 80 and dial 81 are covered by a glass or other transparent member 85 which abuts a sealing ring 86 and which is retained in position by means of the circlip 87.

The shaft 78 is also provided with a movable member 88 which is fixedly mounted thereon so as to move therewith across the inner surface of the end wall 79 of the housing 19. The movable member 88 is formed with a slot 89 which receives a projection 90 on the end wall 79. The movable member 88 is also formed with three apertures 91, 92 and 93 which are adapted to correspond with a passageway 94 formed in the end wall 79 and which communicates the interior of the control unit with the visual indicating position on the outer surface of the control unit. The central aperture 92 is fitted with clear glass while the apertures 91 and 93 are provided with colored glass, for example red and green, so as to give an illuminated colored indication of the position of the valve actuator.

The internal illumination for the coloured glass in the apertures 91, 93 is provided by a lamp 95 which is supported in a conventional socket 96 mounted on a strip 97 secured to the plate 23. The mounting is adjustable by means of screws 98 which engage a slot 99 in the strip 97.

The passageway 94 in the end wall 79 is provided with a block of glass which engages a shoulder 101 in the passageway and is retained therein by means of a circlip 102.

In the operation of the end position indicating device it will be appreciated that rotation of the shaft 78 by the switch actuating mechanism will move the pointer 80 to indicate that the valve has reached its closed or open position. Simultaneously the movable member 88 will be rotated from its central position in which the illumination from the lamp 95 merely gives a white light to the operator to a second position in which the colored glass 91 or 93 will be located in front of the passageway 94 so that a colored light will appear to the operator thus giving a second indication of the valve position which under certain conditions, such as hours of darkness, may be extremely useful. In the open position of the valve the corresponding aperture in the movable member 88 may be provided with a red glass, while the aperture corresponding to the closed position of the valve may be provided with a green glass.

It will be appreciated that the provision of the glass block or bar 100 maintains the flameproof requirements of the actuator while at the same time preventing the ingress of dust and moisture. Furthermore, the provision of the illuminating lamp 95 provides a certain amount of heat so that the lamp provides a dual function in that it maintains the housing for the control unit at a desired temperature.

The invention thereby provides an end or limit position indicator for an actuator in which the pointer mechanism and illuminated device are both operable by the switch operating mechanism. The arrangement has the advantage of giving a visual indication of the exact positioning of the output shaft or valve spindle of the actuator in its limit positions and it furthermore indicates that the limit switches have been operated as the pointer mechanism can only be moved to its limit positions when the switch operating mechanism has moved to actuate the limit switches in the motor control circuits.

I claim:

1. A valve actuator comprising an output shaft; power means operable to selectively rotate said output shaft to open or close a valve in response to rotation of said output shaft in one or other direction; a visual position indicating device; and a control unit for said power means, said control unit including a pair of position limit switches connected in circuit with said power means, a shaft rotatable in response to rotational movement of the output shaft, a threaded hollow spindle mounted on said shaft and frictionally rotatable therewith, a nut mounted on said threaded spindle and normally restrained against rotation, so as to travel along the spindle in accordance with the direction of rotation of the output shaft, said nut being rotatable with said threaded spindle when said nut reaches one of two extreme positions of movement along said spindle, said extreme positions corresponding to the end positions of said output shaft in the open and closed directions, means responsive to rotation of said nut to actuate said limit switches, and means responsive to rotation of said nut to actuate said indicating device.

2. A valve actuator as claimed in claim 1, in which the threaded spindle has adjustable stop means thereon to provide said extreme positions for the travelling nut.

3. A valve actuator as claimed in claim 2, in which the threaded spindle has a fixed flange at one end and an adjustable nut at the other end defining said stop means.

4. A valve actuator as claimed in claim 1, wherein said means to actuate said limit switches includes an actuating plate engaging a notch in the periphery of the travelling nut, said actuating plate being angularly movable by said nut for actuating said limit switches.

5. A valve actuator as claimed in claim 1, wherein the travelling nut is restrained against rotation on said threaded spindle by means of a guide rod extending parallel to said threaded spindle and engaging a notch in the periphery of said travelling nut.

6. A valve actuator as claimed in claim 5, wherein the guide rod is mounted at its ends on the threaded spindle and is centralized by resilient means.

7. A valve actuator as claimed in claim 5, wherein the rotation of said nut causes corresponding angular movement of the guide rod, said means to actuate said indicating device being mechanically connected to said guide rod.

8. A valve actuator as claimed in claim 7, wherein the mechanical connection between the guide rod and the indicating device comprises an operating lever loosely mounted on said threaded spindle and engaging said guide rod for rotational movement thereby, and a shaft mechanically coupled to said operating lever, said indicating device being mounted on said shaft.

9. A valve actuator as claimed in claim 8, wherein the shaft of said indicator pointer is provided with a resilient centralizing device.

10. A valve actuator as claimed in claim 8, wherein said indicating device is mounted in an end compartment of the housing for the control unit, the end wall of the housing being formed with a passage therein and the inner end of said passage being normally closed by a movable member mounted on the shaft of the indicator pointer.

11. A valve actuator as claimed in claim 10, wherein said movable member is formed with colored portions for the transmission of light through said passage to give an illuminated indication of the position of the valve actuator, said control unit including an internal source of light such as a lamp.

12. A valve actuator as claimed in claim 10, further comprising a block of glass mounted in said passage.

References Cited

UNITED STATES PATENTS 1,290,718  1/1919  Crane _____ 318—266 X

ORIS L. RADER, *Primary Examiner.*

B. A. COOPER, *Assistant Examiner.*